United States Patent [19]
Rosengren et al.

[11] Patent Number: 6,007,247
[45] Date of Patent: Dec. 28, 1999

[54] SLOT BEARING

[75] Inventors: Gary W. Rosengren, Brooklyn Park; Derek R. Wise, Minnetonka, both of Minn.

[73] Assignee: Tol-O-Matic, Inc., Hamel, Minn.

[21] Appl. No.: 08/974,794

[22] Filed: Nov. 20, 1997

Related U.S. Application Data

[63] Continuation of application No. 08/658,534, Jun. 5, 1996, abandoned
[60] Provisional application No. 60/016,047, Apr. 22, 1996.

[51] Int. Cl.$^6$ ............................ F16C 33/00; F01B 29/00; F01B 9/00
[52] U.S. Cl. ................................. 384/41; 384/42; 92/88; 92/137
[58] Field of Search ........................... 384/41, 42; 92/88, 92/137

[56] References Cited

U.S. PATENT DOCUMENTS

| | | |
|---|---|---|
| 4,373,427 | 2/1983 | Garlapaty et al. . |
| 4,519,297 | 5/1985 | Lipinski . |
| 4,545,290 | 10/1985 | Lieberman . |
| 4,664,019 | 5/1987 | Lipinski et al. . |
| 4,664,020 | 5/1987 | Kaiser . |
| 4,724,744 | 2/1988 | Rosengren . |
| 4,785,716 | 11/1988 | Vaughn et al. . |
| 4,796,516 | 1/1989 | Horvath . |
| 4,813,341 | 3/1989 | Vaughn . |
| 4,852,465 | 8/1989 | Rosengren . |
| 4,856,415 | 8/1989 | Noda . |
| 4,991,494 | 2/1991 | Migliori . |
| 5,111,913 | 5/1992 | Granbom . |
| 5,138,935 | 8/1992 | Granbom . |
| 5,195,391 | 3/1993 | Barbat et al. . |
| 5,205,204 | 4/1993 | Gottling et al. . |
| 5,275,088 | 1/1994 | Takada et al. . |
| 5,279,207 | 1/1994 | Takada et al. . |
| 5,303,638 | 4/1994 | Green . |
| 5,305,682 | 4/1994 | Kaneko . |
| 5,311,810 | 5/1994 | Takada et al. . |
| 5,330,272 | 7/1994 | Stoll . |
| 5,333,535 | 8/1994 | Miyamoto et al. . |
| 5,335,583 | 8/1994 | Kaneko et al. . |
| 5,363,741 | 11/1994 | Takada et al. . |
| 5,467,686 | 11/1995 | Lipinski . |
| 5,469,775 | 11/1995 | Stoll et al. . |
| 5,483,868 | 1/1996 | Green . |
| 5,517,901 | 5/1996 | Lipinski ....................................... 92/88 |
| 5,555,789 | 9/1996 | Rosengren et al. ......................... 92/88 |

FOREIGN PATENT DOCUMENTS

| | | | |
|---|---|---|---|
| 1111989 | 3/1956 | France ...................................... 384/42 |
| 0150507 | 6/1990 | Japan ...................................... 384/42 |
| 6066304 | 3/1994 | Japan ......................................... 92/88 |

*Primary Examiner*—John A. Jeffery
*Assistant Examiner*—Matthew A. Kaness

[57] ABSTRACT

A slot bearing assembly for a member moveable relative to a slot such as a carrier for a slotted rodless cylinder in which the slot bearing is allowed to float relative to the moveable carrier.

23 Claims, 4 Drawing Sheets

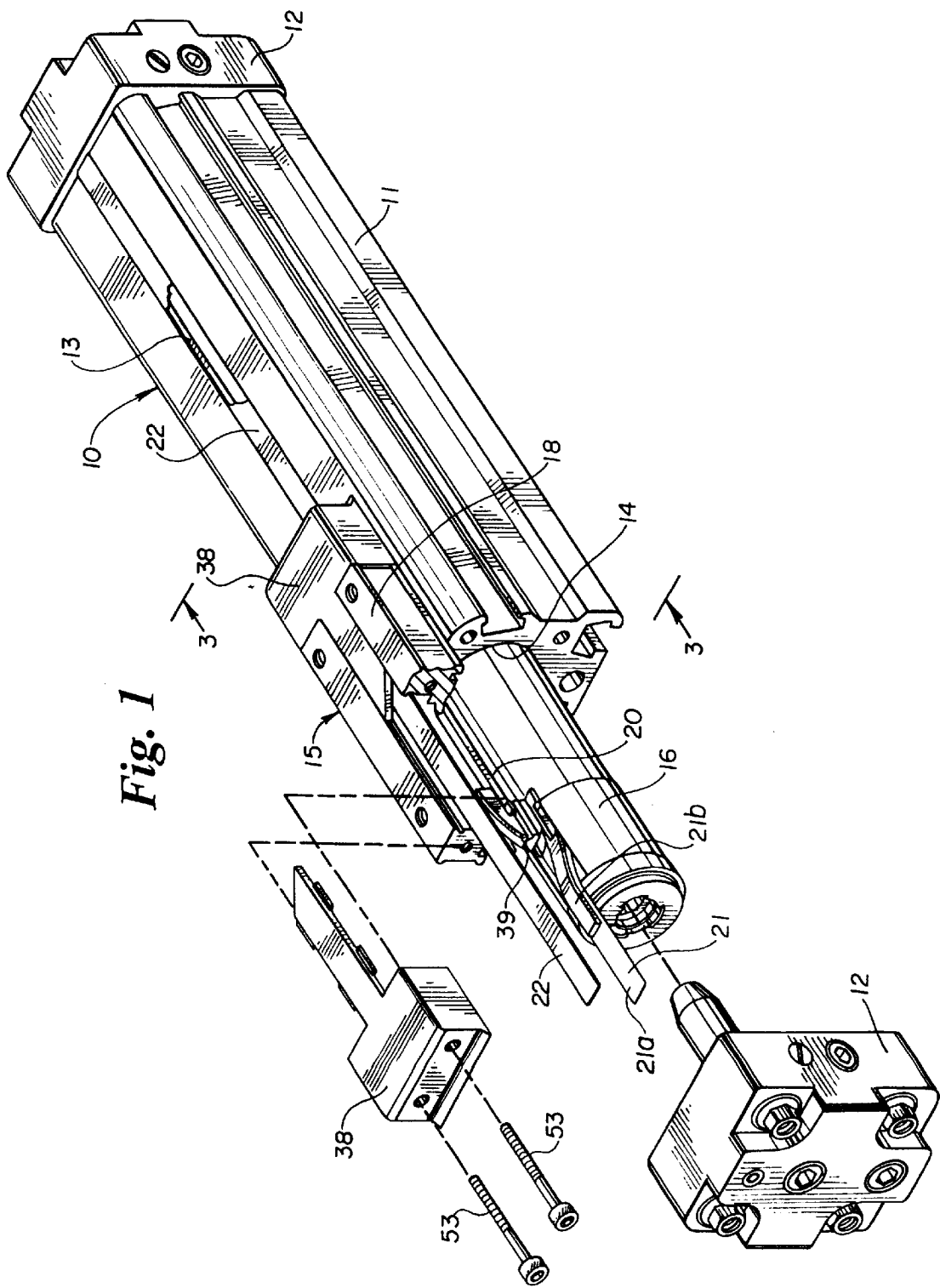

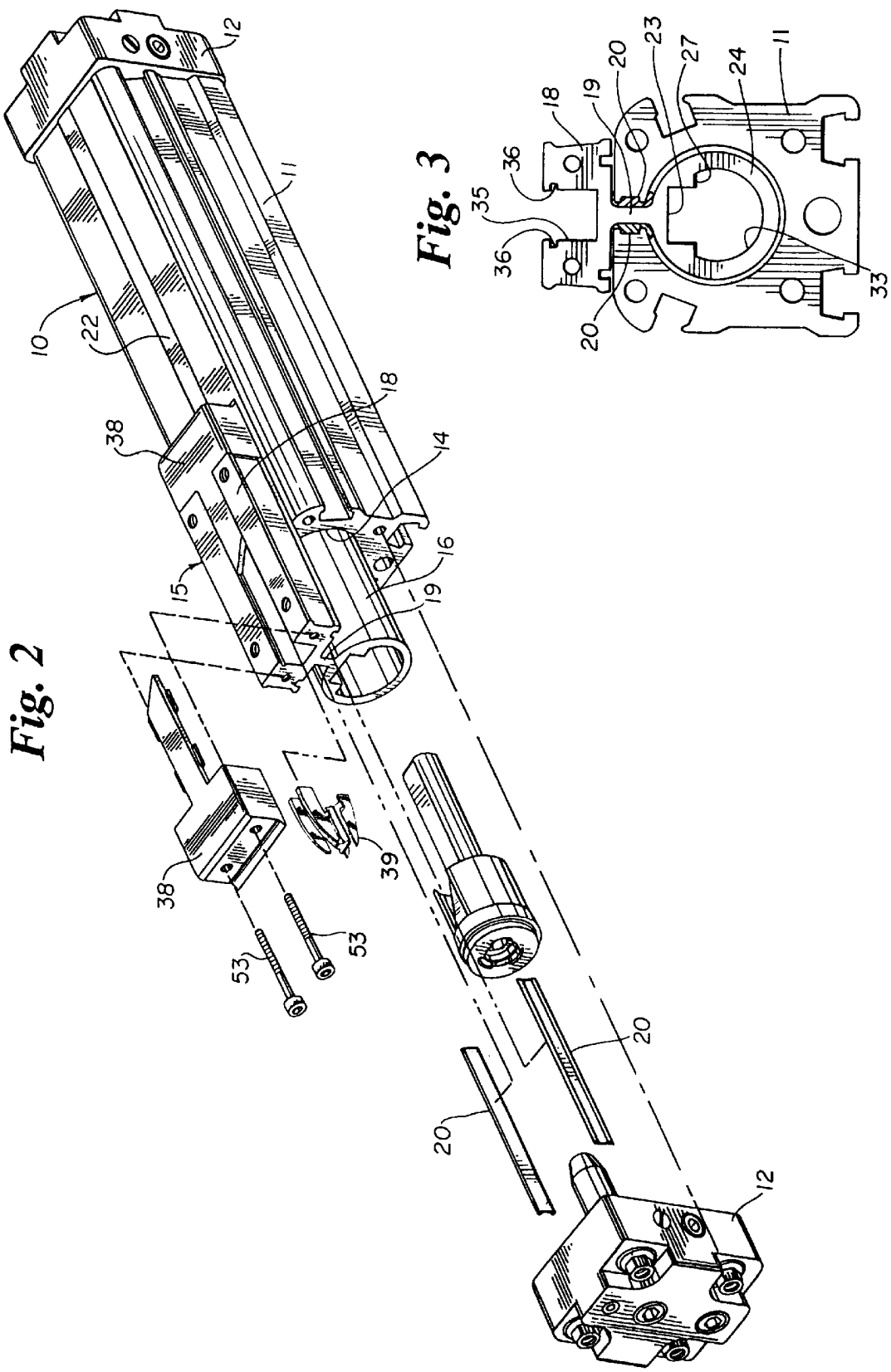

SLOT BEARING

This is a continuation of application Ser. No. 08/658,534 filed Jun. 5, 1996, now abandoned, which claims the benefit of Provisional Application Ser. No. 60/016,047 filed Apr. 22, 1996.

BACKGROUND OF THE INVENTION

1. Field of the Invention

The present invention relates generally to a slot bearing and more particularly to a floating slot bearing for providing a bearing surface between the slot walls and a carrier or other member moveable in the slot. The invention has particular application to rodless cylinders of the type having an elongated slot and a force transfer carrier bracket extending through the slot and moveable along the slot.

2. Description of the Prior Art

Various devices and apparatus exist in which a force or motion transmitting member extends through and is moveable along an elongated slot formed in a substrate or tubular member. One such device is a slotted type rodless pressure cylinder having a force or motion transmitting carrier bracket extending through the slot for transmitting the force or motion of an internal piston to an external workpiece. During this force or motion transfer, loads are imposed on the carrier bracket, the piston and the cylinder. Where the loads are balanced, the piston acts as the primary bearing, thus transferring the forces to the cylinder bore and cylinder wall. In conditions where the loads result in torsion or torque forces on the carrier, however, forces are created between portions of the carrier extending through the slot and the side edges of the slot. In these situations, slot bearings positioned between the carrier and the side edges of the slot are the primary bearing means.

In devices such as rodless cylinders described above which contain slot bearings, it is common for manufactures to securely attach or affix the slot bearings to the carrier in the region of the slot. Common methods for accomplishing this attachment include the use of pins, adhesives, machined recesses or grooves. These attachment techniques not only increase carrier manufacture time, but also, in many cases, weaken the structure of the carrier bracket itself. This is particularly true where portions of the carrier bracket need to be removed to form recesses, grooves or screw holes, to attach the slot bearings.

A device is also known in which holes are formed through the web of the carrier to receive corresponding pins integrally formed with bearing members. Although limited rotational movement of the bearing members relative to the web is permitted abut their respective pins, the formation of the holes increases manufacturing time and tends to weaken the strength of the web.

Accordingly, there is a need in the art for a slot bearing assembly and construction which minimizes the manufacturing cost and which also preserves the strength and integrity of the component parts, and in particular the carrier bracket.

SUMMARY OF THE INVENTION

In contrast to the prior art, the present invention relates to a slot bearing which is not physically attached to the carrier bracket or other motion transmitting member extending through the slot, but which is allowed to float relative to the carrier. This not only maintains the integrity and strength of the carrier bracket and minimizes the carrier manufacturing costs by eliminating any structural modification which may be required to physically connect the slot bearing to the carrier, but also provides for increased manufacturing tolerances relative to the carrier, the bearing and the side walls of the slot.

More specifically, the present invention has particular application to a rodless cylinder having an elongated tubular slotted cylinder body, and a carrier or other member extending through, and designed for movement along, the slot. In the preferred embodiment, the carrier includes an internal piston moveable reciprocally within a bore in the cylinder body, an external portion for connection to a workpiece and a connecting web or portion for connecting the workpiece connection member and the piston. A pair of slot bearings are provided on opposite sides of the connecting web between the connecting web and the side walls of the slot. In the preferred embodiment, the bearing members are captured by retaining tabs or the like to facilitate axial movement of the bearings with the carrier, however, the bearings are not physically attached to the carrier. Thus, they are allowed to float in a radial direction relative to the carrier during reciprocal movement of the carrier along the slotted cylinder.

In some rodless cylinders, the side walls of the slot are provided with a non-planar configuration such as a groove or the like to retain slot sealing members. In such cases, it is preferable for the slot bearings to be provided with a non-planar configuration substantially conforming to at least a portion of the slot side wall configuration.

Accordingly, it is an object of the present invention to provide a slot bearing assembly for a member moveable relative to a slot in which the slot bearing is moveable with, but allowed to float relative to, the moveable member.

Another object of the present invention is to provide a rodless cylinder with an improved slot bearing which minimizes manufacturing costs and tolerances and which maintains the strength and integrity of the force transmitting carrier.

A further object of the present invention is to provide a rodless cylinder having a floating slot bearing.

A still further objection of the present invention is to provide a slot bearing for a rodless cylinder which is captured by a portion of the carrier bracket for axial movement therewith, but which also permits limited relative radial movement between the bearing and the carrier bracket to facilitate increased manufacturing tolerances.

These and other objects of the present invention will become apparent with references to the drawings, the description of the preferred embodiment and the appended claims.

DESCRIPTION OF THE DRAWINGS

FIG. 1 is an isometric partially exploded view of an assembled rodless cylinder with portions broken away incorporating the floating slot bearings in accordance with the present invention.

FIG. 2 is an isometric partially exploded view of a rodless cylinder similar to FIG. 1 with portions broken away.

FIG. 3 is a view, partially in section, as viewed along the section line 3—3 of FIG. 1.

DESCRIPTION OF THE PREFERRED EMBODIMENT

Figure 4:
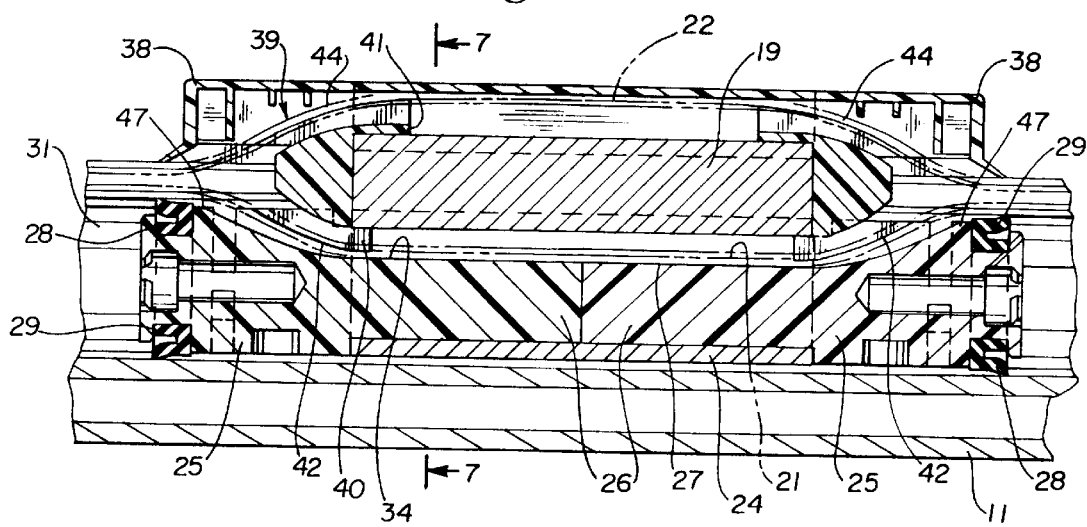
FIG. 4 is a view, partially in section, of the assembled rodless cylinder of FIG. 1 as viewed along a vertical plane extending through the center of the slot in the cylinder wall.

The present invention is directed to a bearing assembly, and in particular a slot bearing assembly, for a member moveable relative to a slot. It is contemplated that the present invention will be applicable to any structure embodying an elongated slot and a member such as a force or motion transmitting carrier extending through the slot and being moveable along the slot. Generally such movement of the carrier will be reciprocal movement relative to the slot. It is also contemplated that the substrate or tubular member which embodies the slot can be planar or non-planar and that the slot can be a straight-line slot or curvalinear.

A feature of the present invention is to provide such a bearing assembly in which the slot bearing is connected or associated with the moveable member or carrier in such a way that it moves with the member or carrier in the direction of movement, but is allowed to "float" relative to such carrier in a direction generally perpendicular to the direction of movement. For purposes of describing the present invention and preferred embodiment, unless stated otherwise, the term "float" shall mean a connection or association between the bearing member and the carrier in which the bearing is not fixedly or immovably secured to the carrier, but is connected or associated in such a way as to permit limited relative movement between the bearing and the carrier in at least one direction. This allows for increased manufacturing tolerances and also maintains the integrity and strength of the carrier.

Although the present invention will have applicability to many different devices and apparatus, it has particular applicability to devices which are referred to as slotted rodless cylinders which include a carrier bracket extending through and moveable along the slot. Accordingly, the drawings illustrate, and the preferred embodiment will be described with respect to, a slot bearing assembly for a rodless cylinder. In such description, an "axial" direction will be considered as generally parallel to the longitudinal axis of the cylinder and the direction of movement of the carrier and a "radial" direction will be considered as generally perpendicular to an axial direction.

With initial reference to FIGS. 1 and 2, the rodless cylinder incorporating the slot bearing assembly of the present invention is illustrated generally by the reference character 10. The cylinder 10 includes an elongated cylinder body 11 in the form of a tubular member having a centrally positioned cylindrical bore 14 and a slot 13, both extending the entire length of the cylinder 11. A pair of heads 12, 12 are positioned at opposite ends of the cylinder 11 and include various ports for introducing fluid pressure into, and exhausting fluid pressure from, the bore 14 in a manner known in the art.

A piston or carrier assembly 15 is reciprocally moveable relative to the cylinder 11 and includes a piston 16 positioned internally within the bore 14, a workpiece connection member 18 positioned outside the cylinder 11 and a connection member or web 19 extending through the slot 13. The connection web 19 functions to connect the member 18 with the piston 16 within the bore 14, and thus transfer force and motion of the piston 16 to the member 18. The member 18 in turn transfers force or motion to the workpiece (not shown). A pair of fluid pressure chambers are defined within the bore 14 at opposite ends of the piston 16.

A pair of slot bearings 20,20 are positioned on opposite sides of the connection web 19 and, as will be described in greater detail below, are disposed between the sides of the connection web 19 and the respective side edges of the slot 13. As shown, the bearings 20 are elongated and conform in length to the connection web 19 of the carrier 15. Preferably the bearings 20,20 are constructed of a low friction synthetic bearing material such as ultrahigh molecular weight polyethylene or polyacetal.

Figure 8:
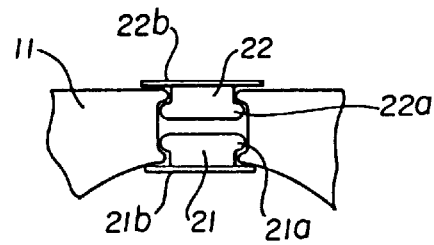
FIG. 8 is a view, partially in section, showing the slot sealing members in sealing engagement with the slot.

As illustrated best in FIGS. 2 and 8, a pair of elongated sealing members 21 and 22 are designed for selective insertion into, and withdrawal from, the slot 13 for sealing the same. Specifically, the inner sealing member 21 is designed for selective insertion into the slot 13 from the interior bore 14 of the cylinder and functions to seal the slot when the fluid pressure chambers in the bore 14 of the cylinder are pressurized. The outer sealing member 22 is designed for selective insertion into, and withdrawal from, the slot 13 from outside the cylinder 11. The seal 22 functions primarily as a dust cover to prevent dust or other contaminates from entering the interior of the cylinder. Both the inner and outer seal members 21 and 22 have a structure which includes a metal base 21*a* and 22*a* and a retaining member 21*b* and 22*b*. The members 21*b* and 22*b* are constructed of a compressible material which is insertable into the elongated slot 13.

As illustrated in FIGS. 3 and 4, the piston 16 includes a central generally cylindrical member 24 having a diameter slightly less than the diameter of the bore 14 to allow the member 24 to travel freely within the bore 14. The external surface of the central portion 24 is generally cylindrical, however, the interior surface of the central portion 24 includes a lower cylindrical surface 33, an upper flat, generally planar surface 23, and a pair of shoulders 27,27 on opposite sides of the surface 23. Each of the surfaces 23, 27, and 33 extend throughout the entire length of the central member 24.

Positioned at each end of the central member 24 is a piston end member 25,25. Each piston end member 25 includes a portion 26 inserted into the central member 24 and retained therein by a press-fit or other means. The outer end of the piston end member 25 is provided with a seal receiving groove 28 for receiving a seal member 29. As shown best in FIG. 4, the outer edge of the seal members 29 are in sealing engagement with the interior surface of the bore 14, thus defining fluid pressure chambers 31 and 32 on opposite ends of the piston 16. The top of each of the piston end members 25,25 includes a curved guide ramp 34 to assist the guiding and support of the inner sealing member 21 during reciprocal movement of the piston 15. During such movement, the outer edge portion 47 of the members 25 and the outer edge of the seals 29 function to urge the inner seal member 21 into sealing position within the slot 13. In the preferred embodiment, the central portion 24 of the piston is constructed of a lightweight metal such as aluminum, while the piston ends 25,25 are preferably constructed of a hard plastic or synthetic material such as polyacetal.

With continuing reference to FIGS. 3 and 4, the central member 24 of the piston is integrally formed with the connection web 19 which is in turn integrally formed with the external workpiece connecting member 18. Thus, in the preferred embodiment, the connection web 19 and the workpiece connecting member 18 are also constructed of a lightweight metal such as aluminum. In some embodiments, however, it is contemplated that this could be replaced with a high strength plastic or other synthetic material.

Figure 9:
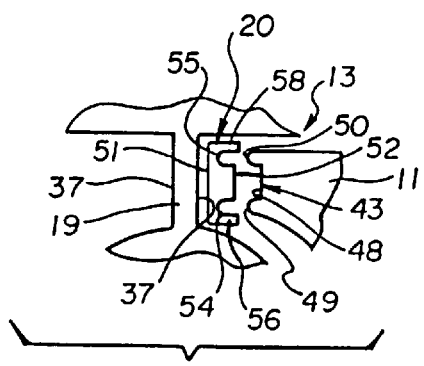
FIG. 9 is an enlarged view, partially in section, showing the relationship between the carrier, the bearing and the slot sidewall.

The web 19 includes generally planar outer side surfaces 37,37 facing the inner side edges 43 of the slot 13 as shown best in FIG. 9. The workpiece connecting member 18 is integrally formed with the top edge of the connecting web 19 and includes a central recess 35 and a pair of internal edges 36,36 (FIG. 3) on its top end to receive portions of the end caps 38,38. The end caps 38,38 are connected with the member 18 by a plurality of screws 53. As shown in FIG. 4, a bottom edge 57 of each end cap 38 functions to urge the sealing member 22 into the slot 13 during reciprocal movement of the piston.

Positioned at each end of the central portion of the carrier is a ramp member 39. The principal function of the member 39 is to cause withdrawal of the inner sealing members 21 and 22 from the slot 13 during reciprocal movement of the piston. Each ramp member 39 includes a portion 40 which extends into the interior of the central piston member 24 for engagement with the surface 23 (FIG. 3) and a portion 41 which extends into the recess 35 and engages the flat bottom surface of such recess. The ramp 39 includes a pair of laterally spaced ramp surfaces 42,42 for engaging the outer edges of the seal member 21 during reciprocation of the carrier to urge the seal member 21 out of the slot 13. Similarly, the top part of the ramp member 39 includes a pair of laterally spaced ramp surfaces 44,44 for engaging the outer edges of the sealing member 22 to urge the sealing member 22 out of the slot 13 during reciprocation of the carrier.

Figure 5:
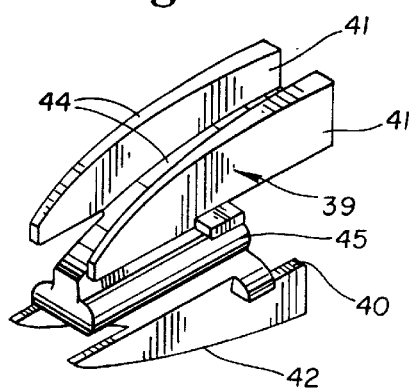
FIG. 5 is an isometric view of a sealing member guide ramp with structure for capturing the floating bearings.
Figure 6:
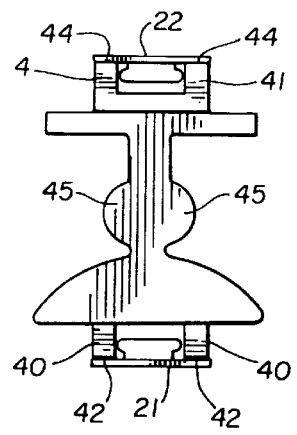
FIG. 6 is a front elevational view of the guide ramp member of FIG. 5 showing the position of the inner and outer slot sealing members relative to such member.
Figure 7:
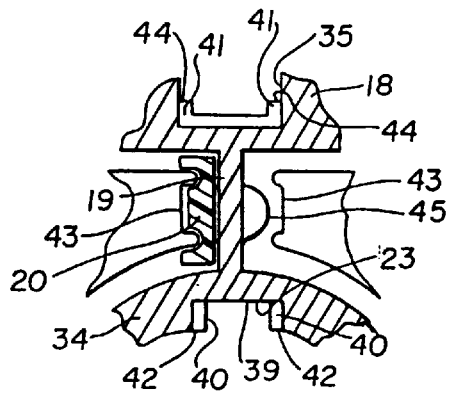
FIG. 7 is an enlarged view, partially in section, and with portions broken away, as viewed along the section line 7—7 of FIG. 4.

As shown best in FIGS. 5, 6 and 7, each of the ramp members 39 also includes an outwardly extending bearing engagement or capture tab 45 extending outwardly from each side of the ramp 39. When the ramp members 39 are assembled and connected with the carrier 15, the tabs 45,45 extend outwardly past the connecting web 19. Such tabs 45,45 function to capture the bearing members 20 axially relative to the carrier, thereby causing the bearings 20 to be moved axially with or carried by the carrier 15 along the cylinder 11.

Reference is next made to FIG. 9 showing the detailed relationship between the central connecting web 19, the bearing 20 and the edge 43 of the cylinder defining the slot 13. As shown, the edge 43 includes a recessed central portion 48 and inner and outer protruding portions 49 and 50, respectively. Each of the bearing members 20 includes a flat, planar surface 51 adapted for engagement with one side planar surface 37 of the connecting web 19 and a bearing surface comprised of a protruding or rib portion 52 and a pair of recessed portions 54 and 55. As shown, the bearing surface comprised of the elements 52,54 and 55 substantially conforms to the configuration of the inner edge 43 defined by the surfaces 48, 49 and 50. The outer edges of each of the bearing members 20 are provided with extending edge portions 56 and 58 which extend past the protruding portions 49 and 50 and function to retain the bearing 20 in a radial direction relative to the cylinder 11 and the slot side edge 43. With this structure, the bearing 20 can slide freely in an axially direction relative to the cylinder 11. However, the extending edges 56 and 58 preclude radial movement of the bearing 20 relative to the cylinder 11.

Figure 10:
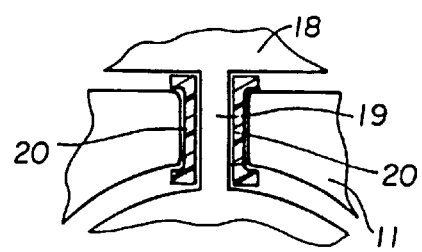
FIG. 10 is a view, partially in section, of an alternative embodiment of the floating bearings in accordance with the present invention.

In the structure of the preferred embodiment as shown in FIGS. 3 and 9, the slot edge 43 is provided with a non-planar configuration and the bearing surface of the bearing 20 is provided with a non-planar configuration substantially conforming to that of the slot edge 43. It is contemplated, however, that the edge surface of the slot may also be substantially planar such as that illustrated in the alternate embodiment of FIG. 10.

Having described the structural details of the present invention, the operation can be understood best as follows. Following assembly of the rodless cylinder, fluid pressure (preferably pneumatic) is selectively introduced into and exhausted from the chambers 31 and 32 at opposite ends of the cylinder 11. This causes the piston 16 and thus the entire carrier 15 to move reciprocally along the cylinder 11. During this movement, the slot 13 is sealed on the inside by the inner sealing member 21 and sealed on the outside by the outer sealing member 22. As illustrated best in FIG. 4, the slot 13 is sealed both inside and outside throughout its entire length except in the area of the piston 16. In this area, the seal members 21 and 22 are guided out of the slot 13 over the ramp surfaces 42 and 44 and back into the slot as the opposite end as the piston passes.

During movement of the carrier 15, the slot bearings 20,20 are captured in the area between the outer substantially planar surfaces 37,37 of the connection web 19 and the inner edges 43 of the slot 13. These bearing members 20,20 are not fixedly secured to the carrier, but are retained in floating relationship relative to the carrier so that limited radial movement of each of the bearings relative to the carrier is preferably permitted. Specifically, each of the bearings 20,20 is captured in an axial direction by the tabs 45,45 on the ramp members 39. This causes the bearings 20,20 to be moved axially along the cylinder 11 with the carrier 15. The bearing members 20,20 are captured in a radial direction relative to the cylinder 11 by the extending portions 56,58. With this structure, the bearings 20,20 are allowed to move axially, but not radially, relative to the cylinder 11 and radially, but not axially, relative to the carrier 15. Such a structure facilitates increased manufacturing tolerances.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

We claim:

1. A rodless cylinder comprising:

an elongated tubular member;

an elongated slot formed in said tubular member, said slot defined by opposing first and second spaced edges and having a slot length defined by first and second slot ends;

a motion transmitting member having a portion extending through said slot between said first and second spaced edges and being moveable along said slot between said first and second slot ends;

a seal member extending between said first and second slot ends and being in sealing engagement with said tubular member along said slot except in the area of said motion transmitting member;

a bearing having a length less than said slot length and positioned between said motion transmitting member and one of said first and second edges, said bearing being carried by and moveable with said motion transmitting member during movement of said motion transmitting member along said slot, said bearing being retained in floating relationship relative to said motion transmitting member and being free of any engagement with said seal member during movement of said motion transmitting member along said slot.

2. The cylinder of claim 1 including means for retaining said bearing in floating relationship relative to said motion transmitting member.

3. The cylinder of claim 1 wherein said motion transmitting member includes a bearing support surface and wherein said cylinder includes a pair of bearing retaining surfaces extending outwardly from said bearing support surface toward said one of said first and second spaced edges to limit movement of said bearing relative to said bearing support surface in a direction parallel to the movement of said motion transmitting member along said slot.

4. The cylinder of claim 1 wherein said one of said first and second spaced edges includes a non-planar configuration and wherein said bearing includes a bearing surface having a configuration at least partially conforming to said non-planar configuration.

5. The cylinder of claim 1 wherein said motion transmitting member includes a planar bearing support surface and wherein said one of said first and second spaced edges includes a non-planar configuration and wherein said bearing includes a bearing surface having a configuration at least partially conforming to said non-planar configuration.

6. The cylinder of claim 1 wherein said motion transmitting member includes a piston within said tubular member, a workpiece connection member external of said tubular member and a connecting portion between said piston and said workpiece connection member.

7. The cylinder of claim 1 including means for selectively moving said seal member into sealing engagement with said slot and withdrawing said seal member from sealing engagement with said slot.

8. The cylinder of claim 1 including tabs extending outwardly from said portion toward said one of said first and second edges to retain said bearing in floating relationship relative to said motion transmitting member.

9. The cylinder of claim 1 wherein said bearing includes a first surface in floating relationship relative to said motion transmitting member, a second surface in sliding relationship relative to said one of said first and second spaced edges and a pair of bearing retaining edges.

10. The cylinder of claim 1 including a first bearing disposed between said motion transmitting member and said first spaced edge and said second bearing disposed between said motion transmitting member and said second spaced edge.

11. The cylinder of claim 1 wherein said motion transmitting member has a motion transmitting member length and said bearing is elongated and has a length no greater than said motion transmitting member length.

12. The cylinder of claim 1 wherein said bearing includes a bearing surface facing said one edge for bearing engagement therewith.

13. A bearing assembly for a member moveable relative to a slot comprising:

a slot defined by first and second spaced edges and having a slot length defined by first and second slot ends;

a member extending through said slot and moveable along said slot, said member having a member length defined by first and second member ends and having a bearing support surface positioned between said first and second spaced edges and facing one of said first and second spaced edges;

a bearing positioned between said bearing support surface and said one of said first and second spaced edges and having a bearing length defined by first and second bearing ends, said bearing further being retained in floating relationship relative to said member, moveable with said member along said slot and free of fixed connection to said member, said member length being less than said slot length and said bearing length being less than said member length.

14. The bearing assembly of claim 13 wherein said slot is a straight line slot and said first and second spaced edges are straight line edges.

15. The bearing assembly of claim 13 including first and second bearing support surfaces positioned between said first and second spaced edges and facing said first and second spaced edges, respectively.

16. The bearing assembly of claim 13 wherein said slot is in a rodless cylinder and said member is a carrier bracket including a piston reciprocally moveable in said cylinder and a workpiece connection member connected with said piston.

17. The bearing assembly of claim 13 including means for retaining said bearing in floating relationship relative to said motion transmitting member.

18. The bearing assembly of claim 13 wherein said one of said first and second edges includes a non-planar configuration and wherein said bearing includes a bearing surface having a configuration at least partially conforming to said non-planar configuration.

19. The bearing assembly of claim 13 wherein said bearing is moveable with said member in the direction of movement and moveable relative to said member in a direction perpendicular to the direction of movement.

20. The bearing assembly of claim 13 wherein said bearing is moveable in sliding movement along said slot relative to said one of said spaced edges.

21. A rodless cylinder comprising;

an elongated tubular member;

an elongated slot formed in said tubular member, said slot defined by opposing first and second spaced edges and having a slot length extending in a longitudinal direction and defined by first and second slot ends;

a motion transmitting member having a web portion positioned between said first and second spaced edges and being moveable along said slot between said first and second slot ends, said web portion including a bearing support surface spaced from and facing one of said first and second spaced edges and a pair of bearing capture surfaces extending from said bearing support surface, said bearing capture surfaces being spaced from one another in said longitudinal direction; and a bearing positioned between said bearing support surface and said one first and second spaced edge, said bearing engaging said bearing capture surfaces and being moveable with said web portion along said slot.

22. The cylinder of claim 21 wherein said bearing capture surfaces extend outwardly from said bearing support surfaces toward said one first and second spaced edge.

23. The cylinder of claim 21 wherein said bearing is positioned between said bearing capture surfaces.

* * * * *